United States Patent
Weerasinghe

(10) Patent No.: US 11,653,064 B2
(45) Date of Patent: May 16, 2023

(54) METHODS AND SYSTEMS FOR DETERMINING DISLIKED CONTENT

(71) Applicant: Charter Communications Operating, LLC, St. Louis, MO (US)

(72) Inventor: Srilal M. Weerasinghe, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 288 days.

(21) Appl. No.: 17/071,035

(22) Filed: Oct. 15, 2020

(65) Prior Publication Data

US 2022/0124408 A1    Apr. 21, 2022

(51) Int. Cl.
| | |
|---|---|
| H04N 21/442 | (2011.01) |
| H04N 21/466 | (2011.01) |
| H04N 21/81 | (2011.01) |
| G06F 16/23 | (2019.01) |
| H04N 21/643 | (2011.01) |
| G06N 20/00 | (2019.01) |
| G06Q 30/0242 | (2023.01) |
| H04N 21/45 | (2011.01) |

(52) U.S. Cl.
CPC ......... *H04N 21/4667* (2013.01); *G06F 16/23* (2019.01); *G06N 20/00* (2019.01); *G06Q 30/0246* (2013.01); *H04N 21/44222* (2013.01); *H04N 21/4532* (2013.01); *H04N 21/4662* (2013.01); *H04N 21/4668* (2013.01); *H04N 21/64322* (2013.01); *H04N 21/812* (2013.01)

(58) Field of Classification Search
CPC ............................................... H04N 21/44222
See application file for complete search history.

(56) References Cited

U.S. PATENT DOCUMENTS

| | | | |
|---|---|---|---|
| 8,387,093 B2 * | 2/2013 | Danker | H04N 21/44224 725/47 |
| 10,318,534 B2 | 6/2019 | Pinckney et al. | |
| 2015/0186383 A1 * | 7/2015 | Pinckney | G06N 5/048 707/748 |

OTHER PUBLICATIONS

Yehuda Koren, Netflix Grand Prize, <https://www.netflixprize.com/assets/GrandPrize2009_BPC_BellKor.pdf>.

* cited by examiner

*Primary Examiner* — Michael H Hong
(74) *Attorney, Agent, or Firm* — Young Basile Hanlon & MacFarlane, P.C.

(57) ABSTRACT

Methods and systems for determining and using disliked content are described. The method includes obtaining, by a service provider system, channel viewing data from a user device of a user, pre-processing, by a content analysis unit, the channel viewing data to mitigate inaccuracies and inconsistencies in the channel viewing data, scaling, by the content analysis unit, the pre-processed channel viewing data to highlight temporal dislike aspects of the pre-processed channel viewing data, applying, by the content analysis unit, machine learning algorithms to the scaled channel viewing data to generate a disliked content ratings matrix, and outputting, by the content analysis unit to user interface systems in the service provider system, to provide enhanced user viewing. The user interface systems including a recommender system, an alternate content generation system, or both.

19 Claims, 9 Drawing Sheets

$$A \approx U_{m \times r} \Sigma_{r \times r} V_{r \times n}^T$$

$$\begin{bmatrix} a_{11} & a_{21} & \cdots & a_{m1} \\ a_{12} & \cdots & \cdots & \cdots \\ \vdots & \vdots & \vdots & \vdots \\ a_{1n} & \cdots & \cdots & a_{mn} \end{bmatrix} \approx \begin{bmatrix} u_{11} & u_{21} & \cdots & u_{m1} \\ u_{12} & \cdots & \cdots & \cdots \\ \vdots & \vdots & \vdots & \vdots \\ u_{1r} & \cdots & \cdots & u_{mr} \end{bmatrix} \begin{bmatrix} \sigma_{11} & 0 & \cdots & \cdots \\ 0 & \sigma_{22} & \cdots & \cdots \\ \vdots & \vdots & \vdots & \vdots \\ \cdots & \cdots & \cdots & \sigma_{rr} \end{bmatrix} \begin{bmatrix} v_{11} & v_{21} & \cdots & v_{r1} \\ v_{12} & \cdots & \cdots & \cdots \\ \vdots & \vdots & \vdots & \vdots \\ v_{1n} & \cdots & \cdots & v_{rn} \end{bmatrix}$$

METHODS AND SYSTEMS FOR DETERMINING DISLIKED CONTENT

TECHNICAL FIELD

This disclosure relates to content viewership affinity. More specifically, this disclosure relates to determining content which is disliked by a user.

BACKGROUND

Television or content viewers routinely encounter shows that they dislike, but they are unable to avoid seeing them. While the consumer opinions are highly subjective, the end-result is the same: flipping the channel, which leads to advertising revenue loss for the programmer. Although retaining viewership of the channel is highly desired, technical challenges have precluded a satisfactory solution thus far. For example, most affinity tracking techniques track a degree to which a user likes an item such as content. Consequently, recommendation systems are inherently biased.

SUMMARY

Disclosed herein are methods and systems for determining disliked content.

In embodiments, the method includes obtaining, by a service provider system, channel viewing data from a user device of a user, pre-processing, by a content analysis unit, the channel viewing data to mitigate inaccuracies and inconsistencies in the channel viewing data, scaling, by the content analysis unit, the pre-processed channel viewing data to highlight temporal dislike aspects of the pre-processed channel viewing data, applying, by the content analysis unit, machine learning algorithms to the scaled channel viewing data to generate a disliked content ratings matrix, and outputting, by the content analysis unit to user interface systems in the service provider system, to provide enhanced user viewing. In implementations, the user interface systems include a recommender system, an alternate content generation system, or both.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 6 is a block diagram of an example device in accordance with some embodiments of this disclosure.

DETAILED DESCRIPTION

Figure 1:
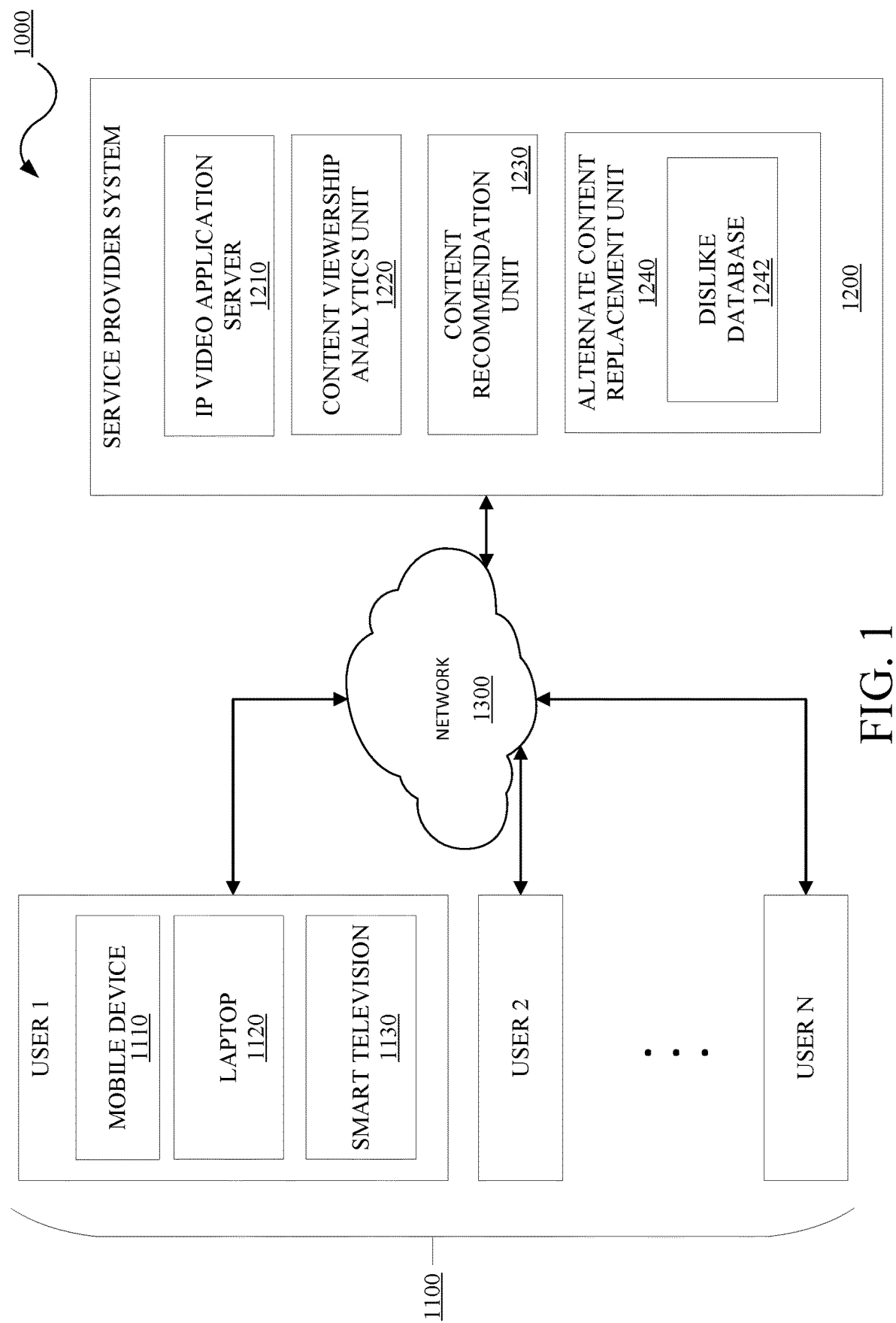
FIG. 1 is a diagram of an example architecture for determining and using disliked content in accordance with some embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for determining and using disliked content. In implementations, viewership data is processed to emphasize content which is minimally watched relative to liked content. In implementations, a temporal aspect of the viewership data is rescaled to emphasize data points at a lower or less watched spectrum of a watch time scale. The processed data is used to create a dislike matrix or vector. Machine learning technique are applied to the dislike matrix or vector to determine disliked content. The disliked content can then be used in recommendation systems or content replacement systems to retain a user on a channel, for example. The methods enable labeling a greater percentage of the content, which in turn leads to more accurate user profiles.

In implementations, an auto-discovery and replacement of disliked content can prevent revenue loss for programmers due to channel surfing. Additional benefits can include enhancements to recommender systems and targeted ad-campaigns. Ad campaigns are generally based on consumer demographic data obtained from data brokers. In implementations, the aggregated data can be refined by comparing with viewership patterns (e.g. time-of-day), garnered from liked and disliked content.

FIG. 1 is a diagram of an example architecture 1000 in accordance with some embodiments of this disclosure. In an implementation, the architecture 1000 can include users $USER_1$, $USER_2$, . . . , $USER_N$ 1100 which can be connected to or in communication with (collectively "connected to") a service provider system 1200 via a network 1300. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

Each user $USER_1$, $USER_2$, . . . , $USER_N$ 1100 can watch or view content with a number of streaming devices, including for example, mobile device(s) 1110, laptops 1120, smart television(s) 1130, and other streaming devices such as set-top boxes, personal computers (PCs), cellular telephones, Internet Protocol (IP) devices, computers, desktop computers, handheld computers, PDAs, personal media devices, notebooks, notepads, phablets and the like. Streaming devices may include applications such as, but not limited to, a mail application, a web browser application, an IP telephony application, an IP video application, and the like.

The service provider system 1200 can provide connectivity and content to the streaming devices via the network 1300. The service provider system 1200 may include, but is not limited to, an IP video application server 1210, a content viewership analytics unit 1220, a content recommendation system 1230, an alternate content replacement unit 1240, and other like systems. In an implementation, the IP video application server 1210, the content viewership analytics unit 1220, the content recommendation system 1230, and the alternate content replacement unit 1240 can be an integrated server or element. The service provider system 1200 is illustrative and may include additional, fewer or different devices, entities and the like which may be similarly or differently architected without departing from the scope of the specification and claims herein.

The IP video application server 1210 may communicate with the IP video applications on the streaming devices. The communication may include content and viewership data. In an implementation, the viewership data may include, but is not limited to, channel identification, streaming device identification numbers, timestamps indicating when streaming started, length of time content was watched, how many times a specific content was watched, viewer identification, and like information.

The content viewership analytics unit 1220 can use the viewership data obtained by the IP video application server 1210 from the IP video applications running on the streaming devices to determine disliked data as described herein. In implementations, the viewership data can include historical viewership data. In implementations, the viewership data can be obtained over a defined period of time. As described herein, the content viewership analytics unit 1220 can process the collected viewership data, scale the processed viewership data to accentuate lesser watched content, create a disliked matrix from the scaled viewership data, and apply machine learning techniques to the scaled viewership data to generate disliked content. In this instance, more of the available content is tagged with a label, enabling more accurate recommendations, for example.

The content recommendation system 1230 can use the disliked content from the content viewership analytics unit 1220 and liked content to perform enhanced user profile analytics as described herein. The enhanced user profile can, for example, weigh the liked content and disliked content on a defined weight basis to generate content recommendations for the user.

The alternate content replacement unit 1240 can include a dislike database 1242 which can be updated with information from the content viewership analytics unit 1220. The alternate content replacement unit 1240 can use the updated dislike database 1242 to review and replace on-air content that is determined to be disliked by the user as described herein.

The network 1300 can be, but is not limited to, a hybrid fiber-coaxial network, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and like including any combinations thereof.

Figure 2:
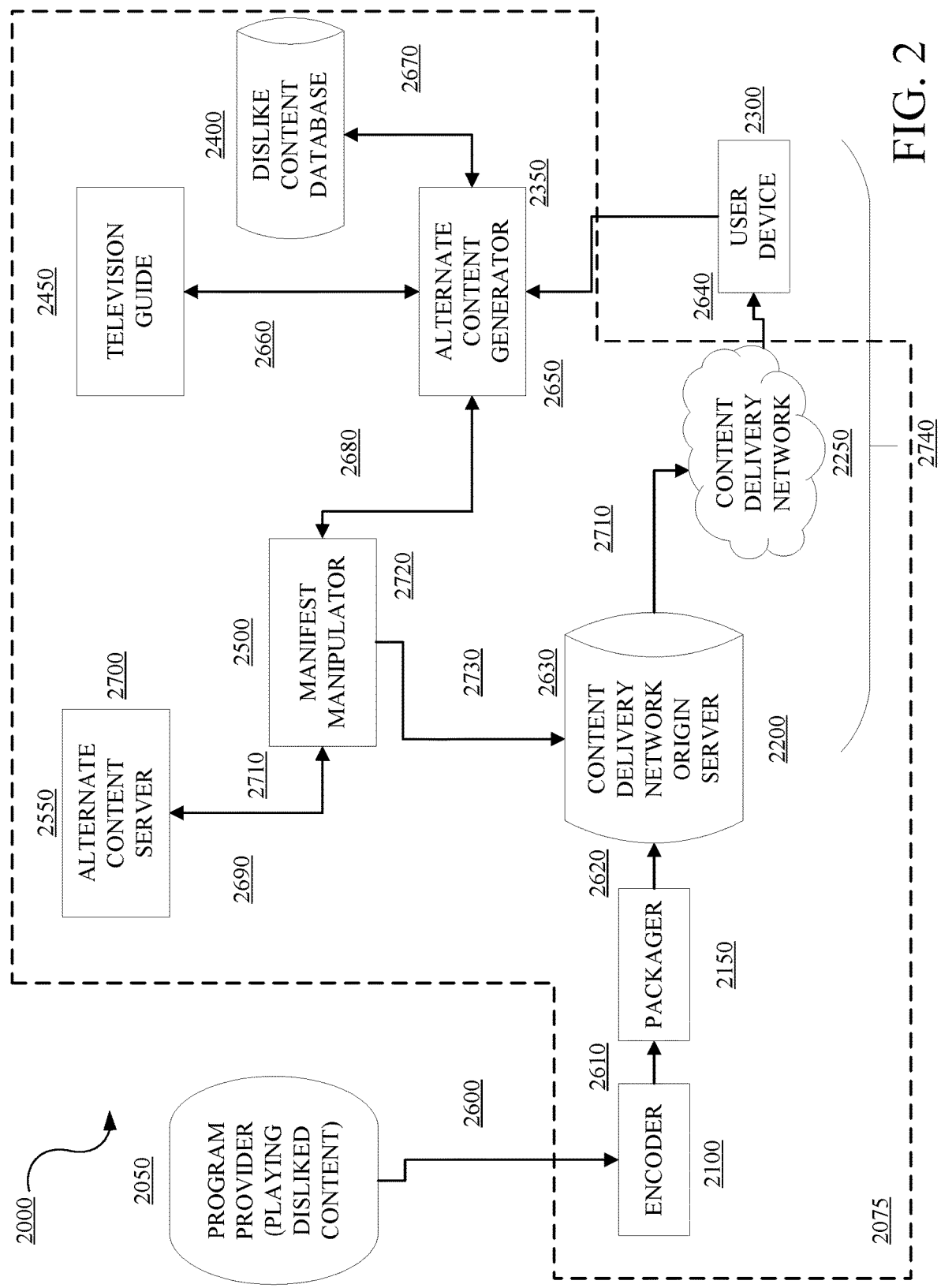
FIG. 2 is a flow diagram of an example content replacement flow using disliked content in accordance with some embodiments of this disclosure.

FIG. 2 is a flow diagram of an example content replacement flow 2000 using disliked content in accordance with some embodiments of this disclosure. The content replacement flow 2000 is described with respect to interactions between a content or program provider 2050 (collectively "content provider"), a content distributer, service provider, or the like 2075 (collectively "service provider"), and a user or consumer using a content playing or streaming device 2300. The service provider 2075 can include an encoder 2100, a packager 2150, a content delivery network origin server 2200, a content delivery network 2250, an alternate content generator 2350, a dislike content database 2400, a television guide 2450, a manifest manipulator 2500, and an alternate content server 2550. The entities described in the content replacement flow 2000 are illustrative and can include additional, fewer or different devices, entities, and the like which may be similarly or differently architected without departing from the scope of the specification and claims herein. Moreover, the illustrated devices may perform other functions without departing from the scope of the specification and claims herein.

The content provider 2050 can provide content or programs for distribution by the service provider 2075 to users using content playing or streaming devices. The content provider 2050 can establish and provide alternate content channels for selected regular channels. The alternate content can be content and programs that aired earlier in the day and are stored in the content delivery network 2250.

The service provider 2075 can provide connectivity and content to the streaming devices via the network 1300. The service provider system 1200 may include, but is not limited to, an IP video application server 1210, a content viewership analytics unit 1220, a content recommendation system 1230, an alternate content replacement unit 1240, and other like systems. In an implementation, the IP video application server 1210, the content viewership analytics unit 1220, the content recommendation system 1230, and the alternate content replacement unit 1240 can be an integrated server or element. The service provider system 1200 is illustrative and may include additional, fewer or different devices, entities and the like which may be similarly or differently architected without departing from the scope of the specification and claims herein.

The encoder 2100 can receive the content from the content provider 2050 and perform format changes and perform like processes which are known to one of skill in the art. The packager 2150 can splice the received content into chunks or segments and perform like processes which are known to one of skill in the art. The video/audio segments (along with an Index file (Manifest) for segment identification), are placed for storage on the content delivery network origin server 2200. The content delivery network origin server 2200 can process and respond to incoming internet requests from internet clients. The content delivery network origin server 2200 can serve all of the content that is available on the content delivery network 2250. The content delivery network 225 is a geographically distributed network of proxy servers and their data centers which provide high availability and performance by distributing the service spatially relative to end users. The television guide 2450 contains content information such as, but not limited to, start and stop times and like information as is known to one of ordinary skill in the art. The television guide 2450 can include a button, icon, or other selectable input to select alternate content or return to original content as needed. The manifest manipulator 2500 can process manifest requests issued by a user device during IP streaming, for example.

The alternate content generator 2350 coordinates with the television guide 2450 and the manifest manipulator 2500 to determine if a currently playing content is a disliked content by checking the currently playing content against the dislike content database 2400. The manifest manipulator 2500 coordinates with the alternate content generator 2350, the alternate content server 2550, and the content delivery network origin server 2200 to act upon a determination of disliked content. The alternate content server 2550 coordinates with the manifest manipulator 2500 to determine the alternate content in response to a finding of disliked content.

Operationally, an alternate content system can be initialized for a user to automatically switch to alternate content upon detection of disliked content or when the user tunes to a channel playing disliked content. In this context, 'tuned to the channel' could also mean accessing a web page, such as in a social-media based network. The dislike content database 2400 includes user generated disliked data and content viewership analytics unit generated disliked data. The program provider 2050 provides an on-air or currently playing content to the user device 2300 via the service provider 2075 (2600). Content, including the on-air or currently playing content and alternate content, are processed by the encoder

2100 (2610), the packager 2150 (2620), and stored at the content delivery network origin server 2200 (2630). The on-air content is provided to the user device via the content delivery network 2250 (2640).

When a user tunes to a channel, the alternate content generator 2350 can determine if the channel is playing content that is disliked content by obtaining content information from the television guide 2450 (2660). The alternate content generator 2350 can query the dislike content database 2400 to determine if the on-air content is disliked content (2670). In the event the on-air content is disliked content, the alternate content generator 2350 can provide the disliked determination information to the manifest manipulator 2500 (2680). The disliked determination information can include user device identification information, on-air program, start times, end times, channel information, and the like information. The manifest manipulator 2500 can communicate the disliked determination information to the alternate content server and associated service database 2550 (2690). The alternate content server 2550 can bind user device identification and disliked determination information with a selected alternate content (2700). The alternate content server 2550 can send the selected alternate content to the manifest manipulator 2500 (2710). The manifest manipulator 2500 can modify an index or manifest file accordingly, replacing the on-air or regular content with the selected alternate content (2720). The updated manifest is sent to the customer device (Client). The manifest manipulator 2500 can send the updated index or manifest file to the content delivery network origin server 2200 (2730). The content delivery network 2250 can send the selected alternate content from the content delivery network origin server 2200 to the user device 2300 (2740).

Figure 3:
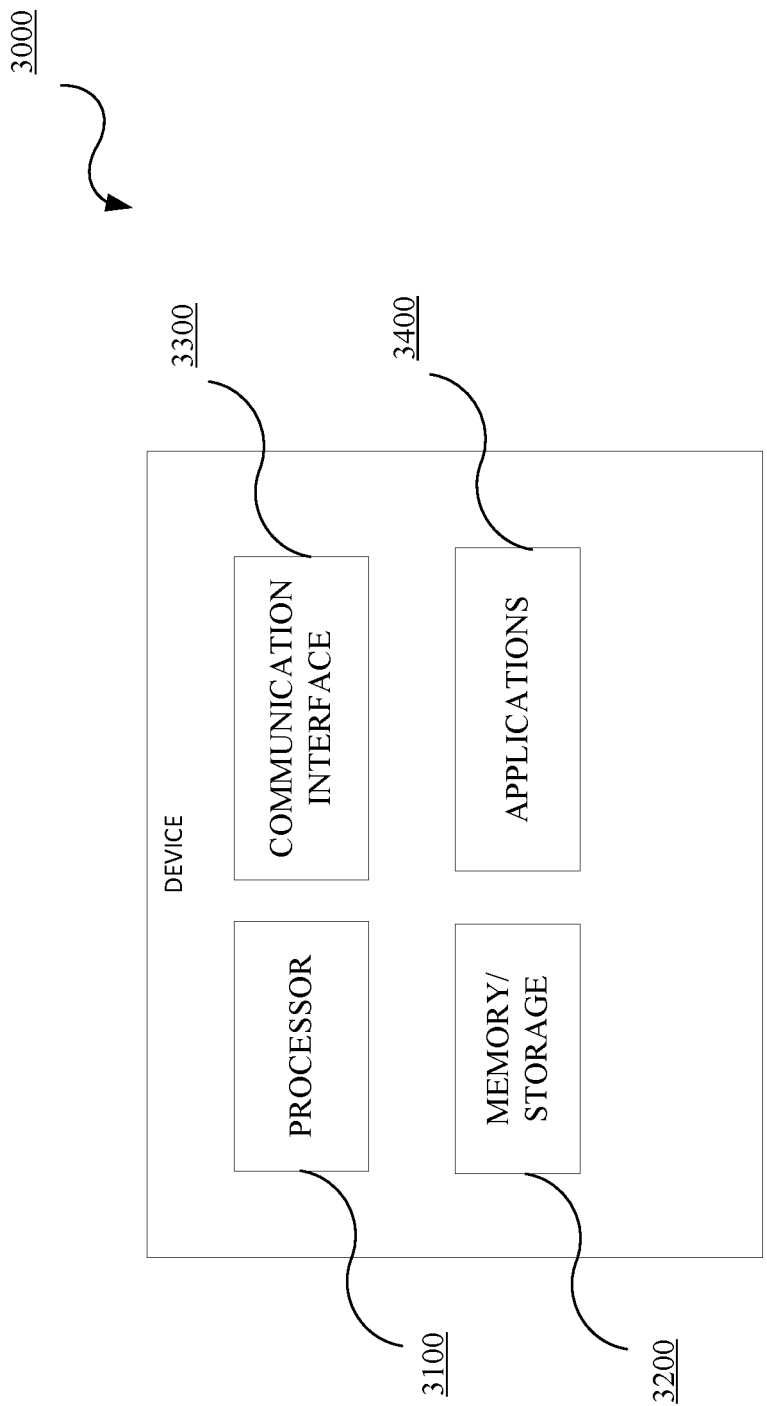
FIG. 3 is a block diagram of an example matrix factorization.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the mobile device(s) 1110, the laptops 1120, the smart television(s) 1130, the IP video application server 1210, the content viewership analytics unit 1220, the content recommendation system 1230, then alternate content replacement unit 1240, the content playing or streaming device 2300, the encoder 2100, the packager 2150, the content delivery network origin server 2200, the content delivery network 2250, the alternate content generator 2350, the dislike content database 2400, the television guide 2450, the manifest manipulator 2500, and the alternate content server 2550, for example. In implementations, the memory/storage 3200 may store the regular content, alternate content, dislike data, like data, regular content information, alternate content information, channel information, start times, end times, rules, and like information. In implementations, the applications 3400 can include, for example, an IP streaming application, alternate content software and application, dislike data software and application, and the like. The techniques or methods described herein may be stored in the memory/storage 3200 and executed by the processor 3100 in cooperation with the memory/storage 3200, the communications interface 3300, and applications 3400, as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

In general, a recommendation or recommender systems are based on user ratings of liked content. In contrast, 'disliked content' may be so averse to a viewer that it is not even rated. Not having user ratings is a barrier for applying the recommender systems model, which uses similarity measures in the latent space to determine affinity. To overcome this lack of data, a different metric based on implicit data is used to create a dislike matrix.

Consumers are overwhelmed by the broad array of choices in product availability. Personalized recommendations are thus vital for a more satisfying user experience. Recommender systems and search systems are both similar in that they attempt to filter relevant information from a deluge of data. In the case of search systems, the user knows what (s)he is looking for. The recommender systems on the other hand, attempt to determine user interests via automated search analytics. The 'items' in this context can be books, movies, music, and the like. Machine learning algorithms enable learning from the data and building predictive models.

The recommender systems generally fall into two broad categories, content-based filtering (CB) and collaborative-filtering (CF). The CB approach is based on the attributes of each item and the user's affinity (rating) for similar items. Content may consist of movie genre, actors, themes, and the like. Based on the users previous ratings, movies that have similar content are recommended.

Unlike CB recommendations, the CF recommendations are based on multiple users' ratings. The assumption is that similar users share the same interest. Sometimes called 'neighborhood methods', they are categorized as user-based or item-based. The user-based CF make recommendations based on the ratings given by other users with similar profiles. In item-based CF, the neighborhood items are those with similar user ratings. The similarity is determined by first forming vectors (rows of ratings matrix) per each user, and computing similarity measures such as Euclidean distance or Cosine similarity between vectors in a multi-dimensional space. Users in the same 'neighborhood' (mathematically speaking) would have a cosine of angle close to 1. Dissimilarity is denoted by a 90° separation. This can be expressed as:

$$\text{similarity} = \cos(\theta) = \frac{u \cdot v}{\|u\|\|v\|} = \frac{\sum_{i=1}^{n} u_i v_i}{\sqrt{\sum_{i=1}^{n} u_i^2} \sqrt{\sum_{i=1}^{n} v_i^2}}$$

Among the algorithmic approaches to solve recommender systems, matrix factorization is a well-known technique. The basic premise of matrix factorization is that there are latent factors that determine the user ratings of items. These latent factors are not measured directly, but their impact is reflected in the user ratings (observed variable). In the case of movies, those could range from obvious features such as action, romance, and comedy to more complex psychological emotions. Such nuances may not have simple labels to describe them. The beauty of the matrix factorization method is that it can handle such complexity with poise via a multi-dimensional vector model.

The starting point is the user-item 'rating matrix' (utility matrix), which in practice may have millions of entries. Note that some cells are empty (user ratings not available). An example is shown in Table 1, where each user's ratings for one or more movies is stored in a matrix.

TABLE 1

|  | Movie 1 | Movie 2 | Movie 3 | ... | Movie n |
|---|---|---|---|---|---|
| User 1 | 5 | N/A | 2 |  | 3 |
| User 2 | 1 | 3 | N/A |  | N/A |
| User 3 | N/A | 4 | 1 |  | 4 |
| ... |  |  |  |  |  |
| ... |  |  |  |  |  |
| User m | N/A | 4 | 1 |  | N/A |

Matrix factorization decomposes the user ratings matrix based on latent factors that contribute to user preferences and item attributes. It then predicts the unknown ratings through the scalar/inner/dot product of the latent features of users and items. For example, if Bob is an action movie aficionado, his profile may consist of:

Bob=60% Action+30% Comedy+10% Romance+0% Historical

Similarly, the profile for movie could be:

Titanic=30% Action+0% Comedy+60% Romance+ 10% Historical

The dot product of these vectors would determine Bob's affinity for the movie Titanic. The larger the dot product between a user vector and an item vector, the item is better suited for user's taste and can be recommended.

Figure 4:
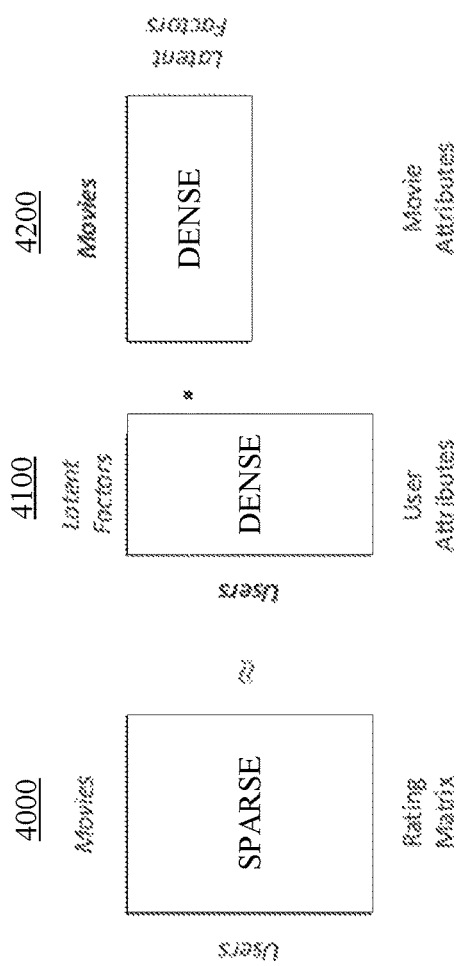
FIG. 4 is a block diagram of an example singular value decomposition.

The rating matrix of Table 1 has many empty cells (sparse), as only a fraction of movies are watched by users, let alone rated. The goal of a recommender system is to fill these gaps. FIG. 4 is a block diagram of an example matrix factorization. A sparse matrix 4000 is expressed in terms of two latent factor matrices, a user attributes matrix 4100 and an item attributes matrix such as a movies attributes matrix 4200. The missing values are approximated by the dot product of the two latent factor matrices via optimization.

Figure 5:
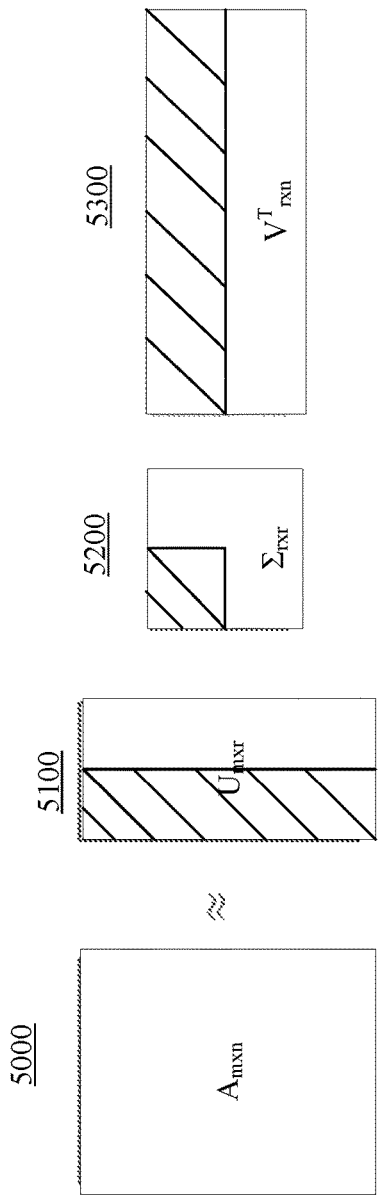
FIG. 5 is a block diagram of an example singular value decomposition in elements form.

Matrix factorization can be implemented using singular value decomposition (SVD). The singular value decomposition factorizes a given matrix 'X' into constituent arrays of feature vectors. FIG. 5 is a block diagram of an example singular value decomposition, $A = U \Sigma V^T$, and FIG. 6 is a block diagram 6000 of an example singular value decomposition in elements form. A given m×n data matrix A 5000 can be decomposed into an orthonormal m×r matrix U 5100, a diagonal r×r matrix Σ 5200, and an orthonormal n×r matrix V 5300. The diagonal r×r matrix Σ 5200 contains the singular values in descending order. The higher values represent the dominant features or latent factors of the given matrix. We consider the reduced form with small Sigma values set to zero.

CF based recommender systems perform poorly when the dimensions in the data increases (sometimes called 'curse of dimensionality'). Reducing the extra dimensions while keeping the salient features is the function of a dimensionality reduction algorithm. SVD filters the dominant features from the data (Sigma matrix) and identify hidden correlations in the singular vectors U and $V^T$.

SVD helps find a lower rank matrix approximation to the original matrix. Mathematically this means picking only the top singular values from the sigma matrix and discarding others. Each singular value defines the 'strength' of the concept. e.g. a high value may indicate the genre of the movie cluster such as action or comedy.

An alternate way to perform matrix factorization is to calculate eigenvalues of the covariance matrix ($A^T A$). Both approaches are consistent in that the square roots of eigenvalues are equal to singular values. The Eigen vectors of the covariance matrix indicate 'principal components' of the matrix. Eigen method (sometimes called spectral decomposition), is computationally more involved.

As mentioned, the main challenge with the matrix factorization methods is that the rating matrix is mostly sparse. This problem is addressed by iteratively calculating each cell value and updating them (using Gradient Descent and Alternate Least Square techniques). The error is minimized by applying Frobenius norm to data matrices.

As noted herein, viewer inputs were explicitly supplied (e.g. one through five stars) to denote a level of likeability of the content. In the case of disked content however, there is no explicit metric. The content is so averse, the viewer simply changes the channel. Not having user ratings is a barrier for applying recommender system models, which use similarity measures in the latent space to determine affinity.

Moreover, the sheer number of channels in a TV subscription, for example, also results to the sparsity of user input data. Most users have never even tuned to the hundreds of channels offered. It would be incorrect to categorize those as disliked content. Note that the present analysis applies to channels containing a mix of liked-content and disliked-content. The goal is to keep the viewer in the same channel. If there are no liked programs at all (i.e. customer never tunes to the channel), then the issue of ad revenue loss is moot.

The content viewership analytics unit 1220 uses a different metric for feature vector creation. The output of the content viewership analytics unit 1220 uses machine learning (ML) analysis to construct a user-item ratings matrix for disliked content, where disliked content is a data point that is not the negative feedback (one star) from a general recommender system. In addition, the content viewership analytics unit 1220 can output liked data. However, due to data scaling as described herein, the magnitudes of the disliked content are now dominant.

The content viewership analytics unit 1220 can collect viewership data over time and apply data analytics to identify disliked content indirectly. Viewership data for disliked data and liked data vary significantly in the time scale such that the disliked data is dominated by the liked data. For example, the channel surfing times for disliked content are about one to two seconds whereas the durations could vary from several minutes per channel to hours for the liked content (regular viewing). The content viewership analytics unit 1220 addresses this via a change of scale adjustment. Moreover, the wide range of the time scale is a barrier for applying machine learning algorithms. This is illustrated below with reference to two algorithmic scenarios.

Cosine similarity is easy to visualize in two dimensions, but its application in the present context is for a multidimensional space. Due to the large disparity in the time scales (few seconds for disliked content versus thousands of seconds for liked content), the user/item vectors in the latent space will not be an accurate depiction. The impact of disliked content will be hard to quantify. On the other hand, simply inverting the scale (e.g. assigning 5 stars for disliked and 1 for liked), will not capture the nuances.

Note that in the singular values matrix, the dominant values are at the top left and decreases down the diagonal:

$$Sigma1 \geq Sigma2 \geq Sigma3$$

The quantities of interest (disliked content with 1-2 seconds), are at the lower end of the time-scale and their impact is washed out by much larger terms in the matrix (thousands of seconds for liked content). As such, the dominant Sigma values do not reflect the impact of disliked content, and skew the results. It is therefore necessary to rescale the data so that the disliked content reflect the dominant terms in the utility matrix.

The content viewership analytics unit 1220 uses a log reciprocal of channel surf time. Since the channel change time could vary from 1 second to several hours (thousands of seconds), the following formula is used:

Disliked Content Measure=$\text{Log}_{10}(10^4/T)=4-\text{Log}_{10}T$

The logarithmic scale converts the wide range of channel view time values to a more manageable compact scale. The original span of 1 second to over 2 hours, is now rescaled to the more compact range from zero to four as shown for example in Table 2.

TABLE 2

|  | ← Disliked Content | | Liked Content → | |
| --- | --- | --- | --- | --- |
| Duration | 1 sec | 10 sec | 15 min | 2 hour |
| Log10 (104/T) | 4 | 3 | 1.045 | 0.143 |

The Log scale captures the 1-5 star ratings implicitly. It is also in line with behavior based algorithms due to the continuity of scale. Conversely, simply assigning 5 stars to shorter times would not be granular. Also, the user response times for channel surfing may be subjective.

Figure 7:
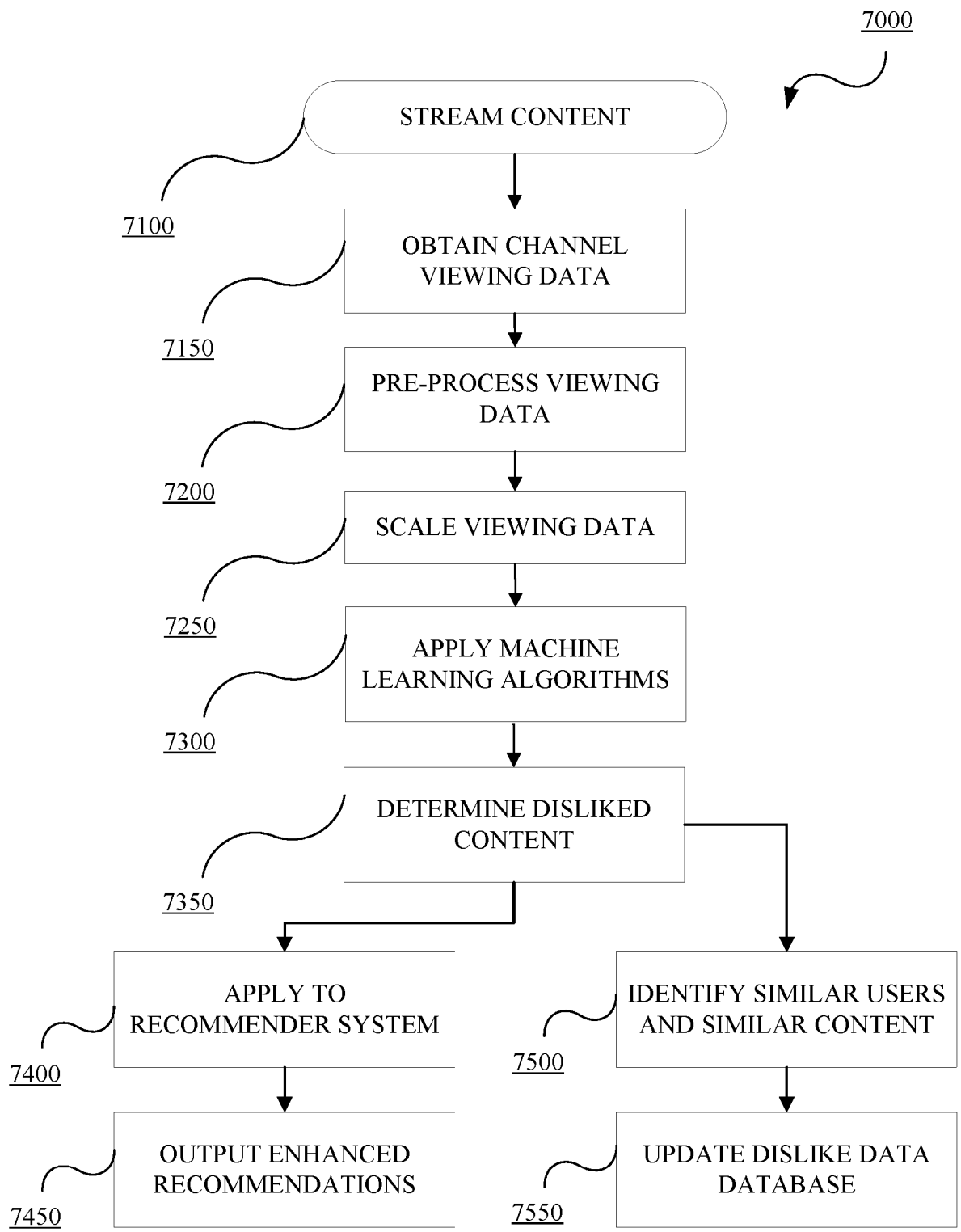
FIG. 7 is a flowchart of an example method for determining and using disliked content in accordance with embodiments of this disclosure.

FIG. 7 is a flowchart of an example method 7000 for determining and using disliked content in accordance with embodiments of this disclosure. The method 7000 includes: streaming 7100 content; obtaining 7150 channel viewing data; pre-processing 7200 the channel viewing data; scaling 7250 the pre-processed channel viewing data; applying 7300 machine learning algorithms to the scaled channel viewing data; determining 7350 disliked content; in implementations, applying 7400 disliked content to a recommender system; outputting 7420 enhanced recommendations; in implementations, identifying 7500 similar users and similar content using the disliked content; and updating 7550 a dislike database. For example, the method 7000 may be implemented, as applicable and appropriate, by the service provider system 1200, the mobile device(s) 1110, the laptops 1120, the smart television(s) 1130, the IP video application server 1210, the content viewership analytics unit 1220, the content recommendation system 1230, then alternate content replacement unit 1240, the content playing or streaming device 2300, the encoder 2100, the packager 2150, the content delivery network origin server 2200, the content delivery network 2250, the alternate content generator 2350, the dislike content database 2400, the television guide 2450, the manifest manipulator 2500, the alternate content server 2550, the device 3000, the processor 3100, the memory/storage 3200, the communication interface 3300, and the applications 3400, for example.

The method 7000 includes streaming 7100 content and obtaining 7150 channel viewing data. A user is streaming content on a user device. The service or system provider is collecting viewership data from the user device(s) with which to perform dislike content determinations using machine learning algorithms. In implementations, the dislike content determinations are done offline. The viewership data is collected over a defined period of time, such as for example, a week, multiple weeks, and the like. The viewership data includes channel information, content information such as title and content identification, time stamps, and the like. In implementations, the viewership data can include historical viewership data. For example, the historical viewership data can be three months' worth of viewership data.

The method 7000 includes pre-processing 7200 the channel viewing data. Pre-processing cleans or filters the viewership data, both the collected and historical viewership data, prior to further analysis to remove inconsistencies from the data. In implementations, the pre-processing can address issues related to whether the channel was viewed by the user in a defined period of time, has the channel been viewed for a defined threshold of time, and/or to account for advertising breaks. In implementations, a rules engine can provide these and other rules for filtering. For instance, most users have never even tuned to the hundreds of channels being offered. It would be incorrect to categorize those as disliked content. Note that the analysis applies to channels containing a mix of liked content and disliked content. The goal is to keep the user/viewer on the same channel. If there are no liked programs at all (i.e. customer never tunes to the channel), then the issue of ad revenue loss is moot.

The method 7000 includes scaling 7250 the pre-processed channel viewing data. As noted herein, the viewership data, both the collected and historical viewership data, is naturally dominated by liked content. A time or data rescale is applied to the viewership data to emphasize the disliked content but preserve relational aspects. In implementations, a log reciprocal of channel view time can be used.

The method 7000 includes applying 7300 machine learning algorithms to the scaled channel viewing data and determining 7350 disliked content. Based on user viewing patterns and latent factor analysis, the method determines what 'kind' of content the user is averse to. In implementations, a disliked content ratings matrix is generated from the machine learning analysis. The output consists of programs and ratings per each user. If more granular data is available from several end-user devices, such as a smart TV, a laptop, a mobile device and the like, then the viewing data from each device can be consolidated, as they all pertain to the same end user (the ratings matrix's purpose is to determine the user's affinity to context, not per device). The output consists not only of disliked content, it would also contain some liked content. However, as a result of the log-reciprocal manipulation, the disliked data would now be the dominant terms in the matrix, whereas 'liked content' is represented as smaller numbers (magnitude). This is the opposite of a generic recommender system rating matrix format. For example, the Netflix movie ratings portray liked content as dominant (e.g. 5 star ratings), and least liked content represented with smaller numbers (e.g. 1 star).

In implementations, the method 7000 includes applying 7400 disliked content to a recommender system and outputting 7420 enhanced recommendations. The service provider system can include a recommender system to promote content to the user based on a variety of factors including the disliked content ratings matrix. The disliked content ratings matrix is input to a recommender system in addition to conventional liked content ratings matrices. In combination and collectively, the two matrices eliminate disliked content from the recommender system input matrix and promote liked content to provide enhanced user recommendations.

In implementations, the method 7000 includes identifying 7500 similar users and similar content using the disliked content and updating 7550 a dislike database. The service provider system can include an alternate content system which enables an automated mechanism for substituting alternate content based on the dislike database, where the dislike database is updated with the dislike content in the disliked content ratings matrix, similarly identified content based on the disliked content ratings matrix, and disliked content from similarly situated users. Moreover, the disliked content ratings matrix can be applied to systems of the similarly situated users to provide enhanced functionality in terms of recommendations and alternate content processing.

Figure 8:
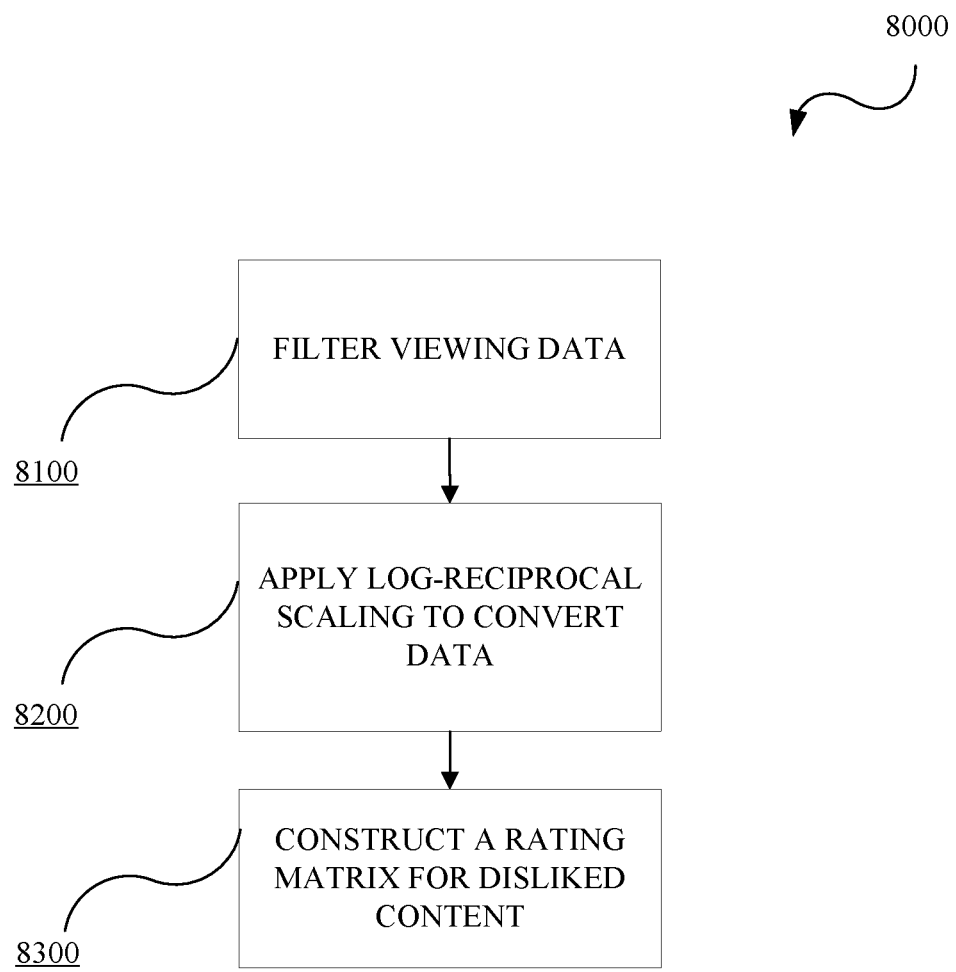
FIG. 8 is a flowchart of an example method for data scaling for use in determining and using disliked content in accordance with embodiments of this disclosure.

FIG. 8 is a flowchart of an example method 8000 for determining and using disliked content in accordance with embodiments of this disclosure. The method 8000 includes: filtering 8100 viewing data; applying 8200 log reciprocal scaling to filtered viewed data; and constructing 8300 a rating matrix for disliked content. For example, the method 8000 may be implemented, as applicable and appropriate, by the service provider system 1200, the mobile device(s) 1110, the laptops 1120, the smart television(s) 1130, the IP video application server 1210, the content viewership analytics unit 1220, the content recommendation system 1230, then alternate content replacement unit 1240, the content playing or streaming device 2300, the encoder 2100, the packager 2150, the content delivery network origin server 2200, the content delivery network 2250, the alternate content generator 2350, the dislike content database 2400, the television guide 2450, the manifest manipulator 2500, the alternate content server 2550, the device 3000, the processor 3100, the memory/storage 3200, the communication interface 3300, and the applications 3400, for example.

The method 8000 includes filtering 8100 viewing data. The service or system provider is collecting viewing data from the user device(s) with which to perform dislike content determinations using machine learning algorithms. In implementations, the dislike content determinations are done offline. The viewing data is collected over a defined period of time, such as for example, a week, multiple weeks, and the like. The viewing data includes channel information, content information such as title and content identification, time stamps, and the like. In implementations, the viewing data can include historical viewing data. For example, the historical viewing data can be three months' worth of viewing data. The viewing data is filtered to remove inconsistencies from the data. In implementations, the filters can address issues related to whether the channel was viewed by the user in a defined period of time, has the channel been viewed for a defined threshold of time, and/or to account for advertising breaks. In implementations, a rules engine can provide these and other rules for filtering. For instance, most users have never even tuned to the hundreds of channels being offered. It would be incorrect to categorize those as disliked content. Note that the analysis applies to channels containing a mix of liked content and disliked content. The goal is to keep the user/viewer on the same channel. If there are no liked programs at all (i.e. customer never tunes to the channel), then the issue of ad revenue loss is moot.

The method 8000 includes applying 8200 log reciprocal scaling to filtered viewed data. The viewing data, both the collected and historical viewing data, is skewed for liked content. A log reciprocal of the viewing data re-aligns the viewing data to discern, reveal or highlight the temporal dislike aspects of the viewing data.

The method 8000 includes constructing 8300 a rating matrix for disliked content. In implementations, machine learning techniques are applied to the scaled viewing data to generate the rating matrix for disliked content. The output consists of programs and ratings per each user. If more granular data is available from several end-user devices, such as a smart TV, a laptop, a mobile device and the like, then the viewing data from each device can be consolidated, as they all pertain to the same end user (the ratings matrix's purpose is to determine the user's affinity to context, not per device). The output consists not only of disliked content, it would also contain some liked content. However, as a result of the log-reciprocal manipulation, the disliked data would now be the dominant terms in the matrix, whereas 'liked content' is represented as smaller numbers (magnitude). This is the opposite of a generic recommender system rating matrix format. For example, the Netflix movie ratings portray liked content as dominant (e.g. 5 star ratings), and least liked content represented with smaller numbers (e.g. 1 star). In implementations, the rating matrix for disliked content can be input to a recommender system. The service provider system can include a recommender system to promote content to the user based on a variety of factors including the rating matrix for disliked content. The rating matrix for disliked content is input to a recommender system in addition to conventional liked content ratings matrices. In combination and collectively, the two matrices eliminate disliked content from the recommender system input matrix and promote liked content to provide enhanced user recommendations. In implementations, the rating matrix for disliked content can be input to an alternate content generation system. A dislike database can be automatically updated based on the rating matrix for disliked content. In implementations, the rating matrix for disliked content can be used to find additional disliked content using a similarity or neighborhood analysis. In implementations, the rating matrix for disliked content can be used to find users having similar profiles for the determined disliked content using a similarity or neighborhood analysis. In implementations, additional disliked content can be identified from the identified users. In implementations, all of the above mentioned additional disliked content can be used to update the dislike database.

Figure 9:
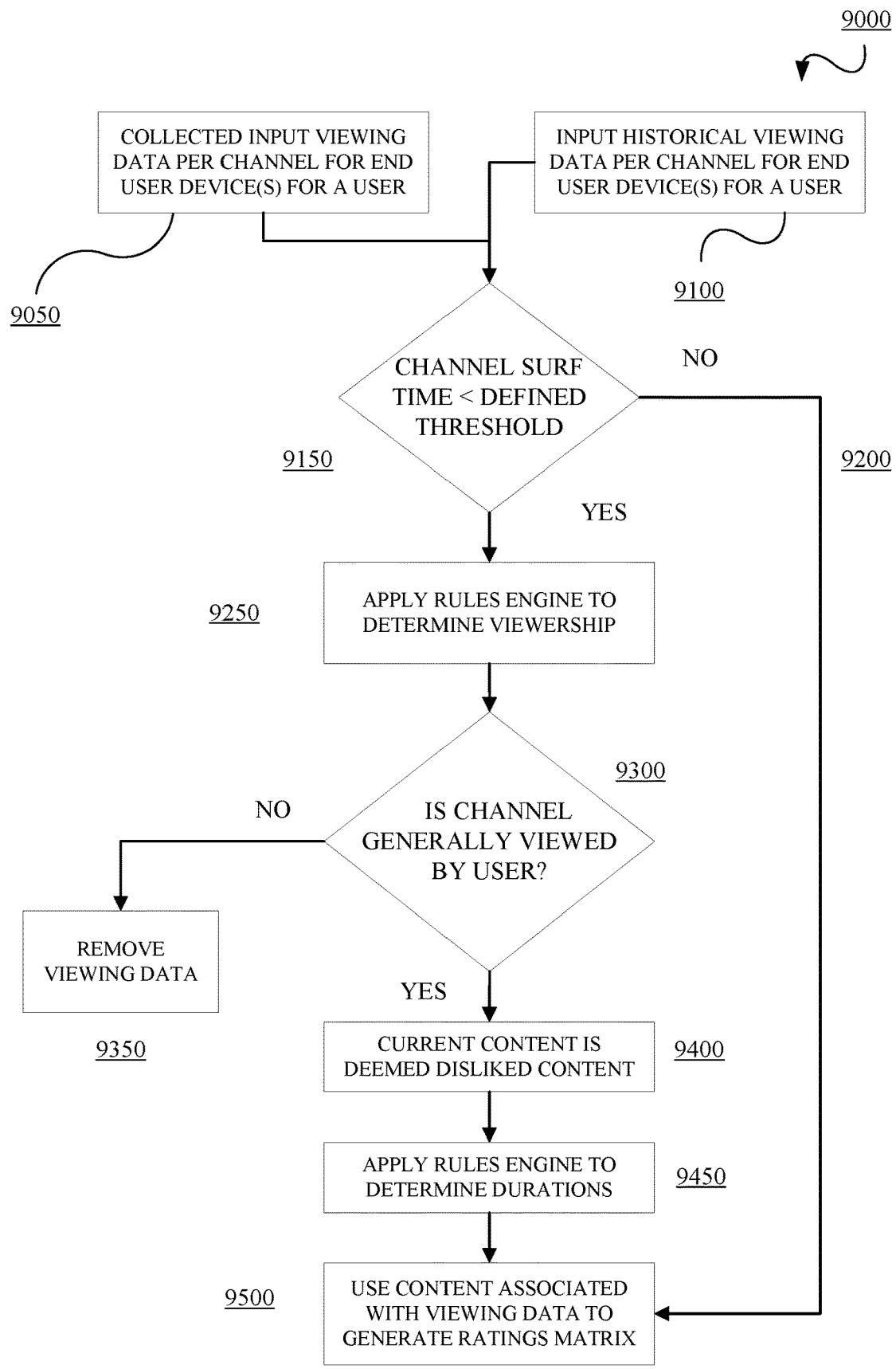
FIG. 9 is a flowchart of an example method for data pre-processing for use in determining and using disliked content in accordance with embodiments of this disclosure.

FIG. 9 is a flowchart of an example method for data pre-processing for use in determining and using disliked content in accordance with embodiments of this disclosure. The method 9000 includes: inputting 9050 collected viewing data per channel from end user device(s) for a user; inputting 9100 historical viewing data per channel for a user; for each channels' collected viewing data and historical viewing data (collectively each "viewing data"): determining 9150 whether a channel viewing time (surf time) is less than a defined threshold; identifying 9200 content as useable for disliked content analysis when viewing time for the channel is at least equal to the defined threshold; applying 9250 rules engine to determine viewership when viewing time for the channel is at least equal to the defined threshold; checking 9300 whether the channel is generally viewed by the user; removing 9350 the viewing data when the channel is not generally viewed by the user; deeming 9400 content associated with the viewing data as disliked content when the channel is generally watched by the user; applying 9450 the rules engine to determine a duration of the viewing data; and using 9500 content associated with the viewing data to generate ratings matrix. For example, the method 9000 may be implemented, as applicable and appropriate, by the service provider system 1200, the mobile device(s) 1110, the laptops 1120, the smart television(s) 1130, the IP video application server 1210, the content viewership analytics unit 1220, the content recommendation system 1230, then alternate content replacement unit 1240, the content playing or streaming device 2300, the encoder 2100, the packager 2150, the content delivery network origin server 2200, the content delivery network 2250, the alternate content generator 2350, the dislike content database 2400, the television guide 2450, the manifest manipulator 2500, the alternate content server 2550, the device 3000, the processor 3100, the memory/storage 3200, the communication interface 3300, and the applications 3400, for example.

The method 9000 includes inputting 9050 collected viewing data per channel from end user device(s) for a user and the method 9000 includes inputting 9100 historical viewing data per channel for a user. The service or system provider is collecting viewing data per channel from the user device(s) and obtaining the historical viewing data for the channel with which to perform dislike content determinations using machine learning algorithms. In implementations, the dislike content determinations are done offline. The viewing data is collected over a defined period of time, such as for example, a week, multiple weeks, and the like. The viewing data includes channel information, content information such as title and content identification, time stamps, and the like. In implementations, the viewing data can include historical viewing data. For example, the historical viewing data can be three months' worth of viewing data. In implementations, the collection period for the collected viewing data is less than the period for the historical viewing data.

The method 9000 includes, for each channels' collected viewing data and historical viewing data (collectively each "viewing data"), determining 9150 whether a channel viewing time (surf time) is less than defined threshold. The collected viewing data and the historical viewing data is used to determine if the user spends more than a minimal time on a channel or is just channel surfing.

The method 9000 includes identifying 9200 content as useable for disliked content analysis when viewing time for the channel is at least equal to the defined threshold. If the user is not simply channel surfing (as defined by the defined threshold), then the viewership data can be used for dislike content analysis. The defined threshold is variable and configurable to prevent overreaching or underreporting of content. For example, the overreaching or underreporting of the viewing data can be based on user actions with respect to content marked as disliked content or with respect to recommendations.

The method 9000 includes applying 9250 rules engine to determine viewership when viewing time for the channel is less than the defined threshold. A two-stage or two-level determination is made to account for recent viewing activities and long term viewing habits. A first stage determination checks whether the channel is viewed for a first defined time over a first defined duration or period (recent activity determination). If the channel is viewed for the first defined time over the first defined duration or period, then the channel is deemed a generally viewed channel. A second stage determination checks whether the channel is viewed for a second defined time over a second defined duration or period (long term activity determination). If the channel is viewed for the second defined time over the second defined duration or period, then the channel is deemed a generally viewed channel. Both stages are done. The channel is deemed generally watched if either stage outputs a generally watched determination. The long term activity determination is set to avoid errors due to short term absences. The two-stage determination is used to avoid overreaching or underreporting in the event of minor changes in viewing habits due to vacations, illness, and the like. If the recent activity determination is ignored and the long term activity determination is the sole determination, errors can arise for new and/or recent users. In implementations, the first defined time, the first defined duration, the second defined time, and the second defined duration are configurable by the content viewership analytics unit or the service provider system, for example, based on overreaching or underreporting of viewing data for a channel with respect to identification as disliked content. For example, the overreaching or underreporting of the viewing data can be based on user actions with respect to content marked as disliked content or with respect to recommendations.

The method includes checking 9300 whether the channel is generally viewed by the user. The output of the rules engine analysis is reviewed as to whether the channel is generally viewed by the user.

The method 9000 includes removing 9350 the viewing data when the channel is not generally viewed by the user. If the user does not generally watch the channel, then the viewing data is removed from the disliked content analysis.

The method 9000 includes deeming 9400 content associated with the viewing data as disliked content when the channel is generally watched by the user. The content can be used for disliked content analysis.

The method 9000 includes applying 9450 rules engine to determine duration of the viewing data. The rules engine accounts for a user changing a channel during an advertisement and returning after the advertisement is over. In these instances, the total viewing time per program shall be the sum of such viewed segment durations (sans ad break). This can be done using the content information, start and stop times, and other like information. If the channel change occurs while an advertisement is aired, the advertisement time should not be counted towards disliked-content. Instead the viewed segments before and after are added.

The method 9000 includes using 9450 content associated with the viewing data to generate ratings matrix.

Figure 10:
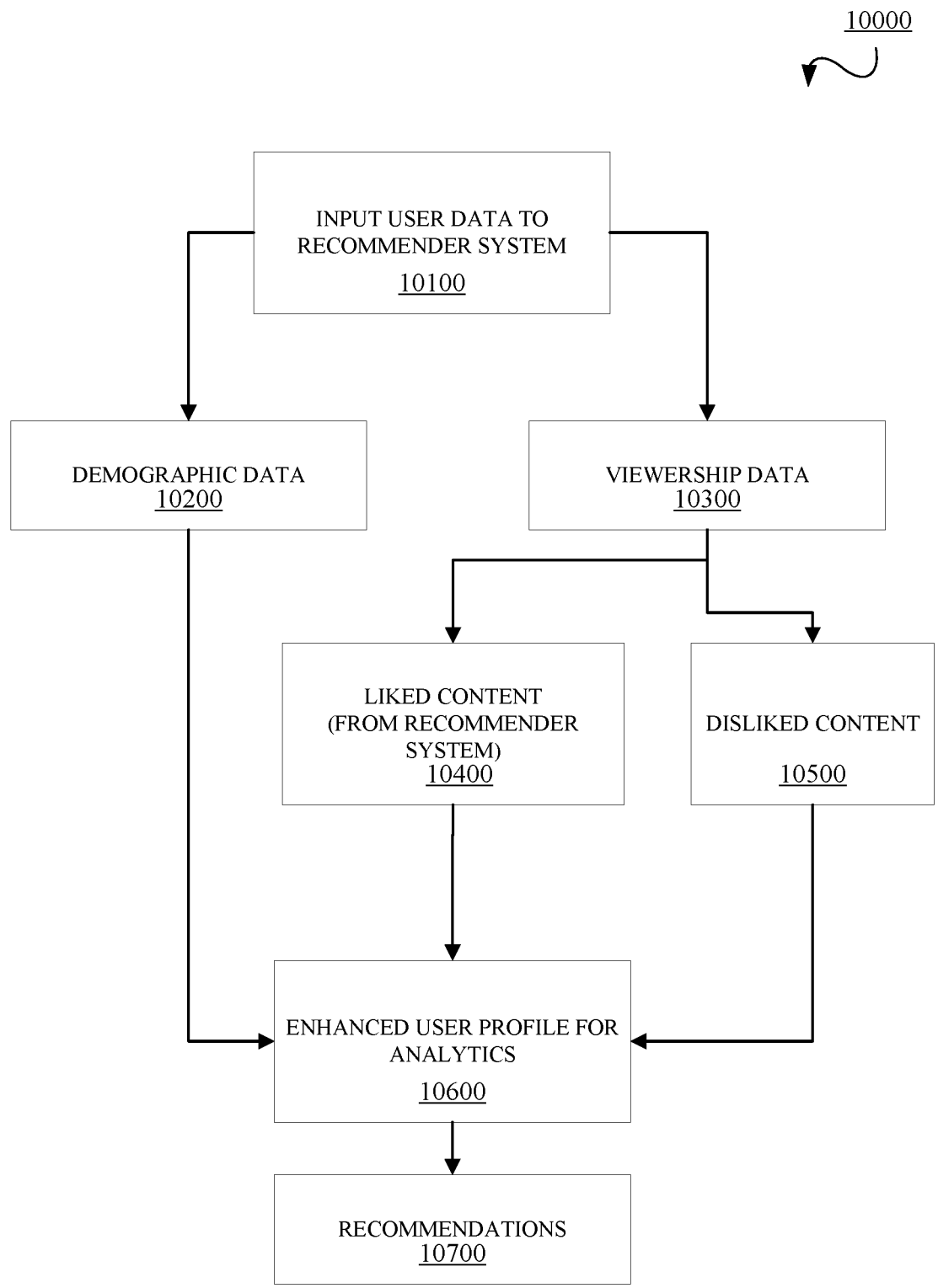
FIG. 10 is a flowchart of an example method for a recommendation system using disliked content in accordance with embodiments of this disclosure.

FIG. 10 is a flowchart of an example method 10000 for a recommendation system with disliked content in accordance with embodiments of this disclosure. The method 10000 includes: inputting 10100 user data to a recommender system; applying 10200 demographic data from the user data for user profile generation; applying 10300 viewership data from the user data for content analytics; generating 10400 liked content by the recommender system; generating 10500 disliked content from a content analysis system; generating 10600 an enhanced user profile from the demographic data, the liked content, and the disliked content; and providing 10700 recommendations to the user based on the enhanced user profile. For example, the method 10000 may be implemented, as applicable and appropriate, by the service provider system 1200, the mobile device(s) 1110, the laptops 1120, the smart television(s) 1130, the IP video application server 1210, the content viewership analytics unit 1220, the content recommendation system 1230, then alternate content replacement unit 1240, the content playing or streaming device 2300, the encoder 2100, the packager 2150, the content delivery network origin server 2200, the content delivery network 2250, the alternate content generator 2350, the dislike content database 2400, the television guide 2450, the manifest manipulator 2500, the alternate content server 2550, the device 3000, the processor 3100, the memory/storage 3200, the communication interface 3300, and the applications 3400, for example.

The method 10000 includes inputting 10100 user data to a recommender system. User data is collected by a service provider over a defined period of time.

The method 10000 includes applying 10200 demographic data from the user data for user profile generation. The user data can include demographic data which can be used for user profile definition.

The method 10000 includes applying 10300 viewership data from the user data for content analytics. The user data can include viewership data which can be used for content and channel analysis and the user profile definition.

The method 10000 includes generating 10400 liked content by the recommender system. The recommender system can generate liked content using applicable techniques from the viewership data.

The method 10000 includes generating 10500 disliked content from a content analysis system. A content analysis system such as the content viewership analytics unit 1220 can generate disliked content using the techniques described herein including, but not limited to, the techniques described with respect to FIGS. 7-9.

The method 10000 includes generating 10600 an enhanced user profile from the demographic data, the liked content, and the disliked content. The demographic data, the liked content from the recommender system, and the disliked content from the content analysis system can provide enhanced recommendations to the user where the disliked content provides additional data about user preferences to enhance the recommender system. This can mitigate a lack of input data or the sparsity of data input to the recommender system.

The method 10000 includes providing 10700 recommendations to the user based on the enhanced user profile.

In general, a method for enhanced user viewing including obtaining, by a service provider system, channel viewing data from a user device of a user, pre-processing, by a content analysis unit, the channel viewing data to mitigate inaccuracies and inconsistencies in the channel viewing data, scaling, by the content analysis unit, the pre-processed channel viewing data to highlight temporal dislike aspects of the pre-processed channel viewing data, applying, by the content analysis unit, machine learning algorithms to the scaled channel viewing data to generate a disliked content ratings matrix, and outputting, by the content analysis unit to user interface systems in the service provider system, to provide enhanced user viewing. In implementations, the channel viewing data includes collected viewing data over a defined time period and historical viewing data. In implementations, the pre-processing further including checking if the channel viewing data is less than a surfing threshold, and performing a multi-level determination when the channel viewing data is less than the surfing threshold. In implementations, the performing further including checking whether a channel associated with the channel viewing data is viewed for a first defined time over a first defined duration, checking whether the channel associated with the channel viewing data is viewed for a second defined time over a second defined duration, wherein the second defined time is greater than the first defined time and the second defined duration is greater than the second defined time, and identifying the channel as a generally channel by the user when the channel is viewed for the first defined time over the first defined duration, or when the channel is viewed for the second defined time over the second defined duration. In implementations, the pre-processing further including calculating channel viewing data duration by accounting for channel switching due to advertisements. In implementations, the scaling further including applying a log reciprocal to the channel viewing data to emphasize low end temporal quantities inferentially associated with disliked content. In implementations, the user interface systems is a recommender system, the method including generating, by the recommender system, a liked content ratings matrix, applying, by the recommender system, the liked content ratings matrix and the dislike content ratings matrix, and providing enhanced recommendations to the user based on the liked content ratings matrix and the dislike content ratings matrix. In implementations, the user interface systems is an alternate content generation system, the method including updating a dislike database in the alternate content generation system with the dislike content ratings matrix, automatically determining when a current content on a channel is a disliked content for the user by comparing the current content against the updated dislike database, automatically selecting an alternate content for the channel, and streaming the selected alternate content to a user device of the user. In implementations, the method including generating a user profile using at least the disliked content ratings matrix, identifying similar users, and updating user interface systems of the identified similar users with the dislike content ratings matrix. In implementations, the method including identifying similar content using the disliked content ratings matrix, and updating the disliked content ratings matrix with the identified similar content.

In general, a service provider system including an Internet Protocol (IP) server configured to obtain viewership data from at least one streaming device associated with a user, a content viewership analyzer configured to filter the viewership data using a defined set of rules which account for user viewership tendencies, apply a reciprocal logarithmic scale to filtered viewership data to amplify the viewership data implicitly representative of disliked content, and generate disliked content by applying machine learning algorithms to scaled viewership data, and an alternate content replacement generator configured to automatically identify an on-air content on a channel as disliked content using a dislike database for the user, wherein the dislike database is updated by the content viewership analyzer using the disliked content, and automatically replacing the on-air content with an alternate content on the channel. In implementations, the content viewership analyzer further configured to use content associated with the viewership data for disliked content generation when the viewership data is at least equal to a threshold. In implementations, when the viewership data is less than the threshold, the content viewership analyzer further configured to identify a channel as generally watched by the user when the channel which is associated with the viewership data is viewed for a first defined time over a first defined duration, and identify a channel as generally watched by the user when the channel which is associated with the viewership data is viewed for a second defined time over a second defined duration, wherein the second defined time is greater than the first defined time and the second defined duration is greater than the second defined time. In implementations, the content viewership analyzer further configured to remove the viewership data when the viewership data is not generally watched by the user. In implementations, the content viewership analyzer further configured to account for channel switching during advertisements in calculating a duration for a content associated with the viewership data. In implementations, the content viewership analyzer further configured to identify similar content based on the disliked content, and update the dislike database. In implementations, the content viewership analyzer further configured to identify similarly situated users based on the disliked content, and update dislike databases for identified similarly situated users. In implementations, the system further including a recommendation system configured to provide user recommendations based on the disliked content in combination with a liked content.

In general, a content provider system including a streaming server configured to obtain user viewing data from at least one streaming device associated with a user, a content analyzer configured to apply a rules engine to filter the user viewing data for user tendencies, apply a reciprocal logarithmic scale to rules applied user viewing data to highlight implicitly disliked content, and use machine learning algorithms on scaled user viewing data to generate a disliked ratings matrix, and a recommender system configured to provide user recommendations based on the disliked ratings matrix in combination with a liked ratings matrix. In implementations, the content provider system further including a content replacement system configured to automatically identify currently streaming content on a channel as user disliked content using a dislike database associated with the user, wherein the user dislike database is updated by the content analyzer using the disliked ratings matrix, and automatically replacing the currently streaming content with an alternate content on the channel.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for enhanced user viewing, the method comprising:
    obtaining, by a service provider system, channel viewing data from a user device of a user;
    pre-processing, by a content analysis unit, the channel viewing data to mitigate inaccuracies and inconsistencies in the channel viewing data;
    scaling, by the content analysis unit, the pre-processed channel viewing data to highlight temporal dislike aspects of the pre-processed channel viewing data, wherein the scaling comprises applying a log reciprocal to the pre-processed channel viewing data to emphasize low end temporal quantities inferentially associated with disliked content;
    applying, by the content analysis unit, machine learning algorithms to the scaled channel viewing data to generate a disliked content ratings matrix; and
    outputting, by the content analysis unit, enhanced recommendations which promote one or more content based on at least the disliked content ratings matrix to user interface systems in the service provider system, to provide enhanced user viewing.

2. The method of claim 1, wherein the channel viewing data includes collected viewing data over a defined time period and historical viewing data.

3. The method of claim 1, wherein the pre-processing further comprising:
    checking if the channel viewing data is less than a surfing threshold; and
    performing a multi-level determination when the channel viewing data is less than the surfing threshold.

4. The method of claim 1, wherein the user interface systems is a recommender system, the method comprising:
    generating, by the recommender system, a liked content ratings matrix;
    applying, by the recommender system, the liked content ratings matrix and the dislike content ratings matrix; and
    providing enhanced recommendations to the user based on the liked content ratings matrix and the dislike content ratings matrix.

5. The method of claim 3, wherein the performing further comprising:
    checking whether a channel associated with the channel viewing data is viewed for a first defined time over a first defined duration;
    checking whether the channel associated with the channel viewing data is viewed for a second defined time over a second defined duration, wherein the second defined time is greater than the first defined time and the second defined duration is greater than the second defined time; and
    identifying the channel as a generally watched channel by the user when the channel is viewed for the first defined time over the first defined duration, or when the channel is viewed for the second defined time over the second defined duration.

6. The method of claim 5, wherein the pre-processing further comprising:
    calculating channel viewing data duration by accounting for channel switching due to advertisements.

7. The method of claim 4, wherein the user interface systems is an alternate content generation system, the method comprising:
    updating a dislike database in the alternate content generation system with the dislike content ratings matrix;
    automatically determining when a current content on a channel is a disliked content for the user by comparing the current content against the updated dislike database;
    automatically selecting an alternate content for the channel; and
    streaming the selected alternate content to a user device of the user.

8. The method of claim 7, the method comprising:
    generating a user profile using at least the disliked content ratings matrix;
    identifying similar users; and
    updating user interface systems of the identified similar users with the dislike content ratings matrix.

9. The method of claim 8, the method comprising:
    identifying similar content using the disliked content ratings matrix; and
    updating the disliked content ratings matrix with the identified similar content.

10. A service provider system comprising:
    an Internet Protocol (IP) server configured to obtain viewership data from at least one streaming device associated with a user;
    a content viewership analyzer configured to:
        filter the viewership data using a defined set of rules which account for user viewership tendencies;
        apply a reciprocal logarithmic scale to filtered viewership data to amplify the viewership data implicitly representative of disliked content; and
        generate disliked content by applying machine learning algorithms to scaled viewership data; and
    an alternate content replacement generator configured to:
        automatically identify an on-air content on a channel as disliked content using a dislike database for the user, wherein the dislike database is updated by the content viewership analyzer using the disliked content; and
        automatically replacing the on-air content with an alternate content on the channel.

11. The system of claim 10, the content viewership analyzer further configured to use content associated with the viewership data for disliked content generation when the viewership data is at least equal to a threshold.

12. The system of claim 10, further comprising:
    a recommendation system configured to provide user recommendations based on the disliked content in combination with a liked content.

13. The system of claim 11, wherein when the viewership data is less than the threshold, the content viewership analyzer further configured to:
    identify a channel as generally watched by the user when the channel which is associated with the viewership data is viewed for a first defined time over a first defined duration; and
    identify a channel as generally watched by the user when the channel which is associated with the viewership data is viewed for a second defined time over a second defined duration, wherein the second defined time is greater than the first defined time and the second defined duration is greater than the second defined time.

14. The system of claim 11, the content viewership analyzer further configured to account for channel switching during advertisements in calculating a duration for a content associated with the viewership data.

15. The system of claim 11, the content viewership analyzer further configured to:
   identify similar content based on the disliked content; and
   update the dislike database.

16. The system of claim 13, the content viewership analyzer further configured to remove the viewership data when the viewership data is not generally watched by the user.

17. The system of claim 15, the content viewership analyzer further configured to:
   identify similarly situated users based on the disliked content; and
   update dislike databases for identified similarly situated users.

18. A content provider system comprising:
   a streaming server configured to obtain user viewing data from at least one streaming device associated with a user;
   a content analyzer configured to:
      apply a rules engine to filter the user viewing data for user tendencies;
      apply a reciprocal logarithmic scale to rules applied user viewing data to highlight implicitly disliked content; and
      use machine learning algorithms on scaled user viewing data to generate a disliked ratings matrix; and
   a recommender system configured to provide user recommendations based on the disliked ratings matrix in combination with a liked ratings matrix.

19. The content provider system of claim 18, further comprising:
   a content replacement system configured to:
      automatically identify currently streaming content on a channel as user disliked content using a dislike database associated with the user, wherein the user dislike database is updated by the content analyzer using the disliked ratings matrix; and
      automatically replacing the currently streaming content with an alternate content on the channel.

* * * * *